July 14, 1925.

J. W. CARNAHAN 1,545,736

RESILIENT METAL WHEEL CONSTRUCTION

Filed April 5, 1920   3 Sheets-Sheet 1

Inventor
J. W. CARNAHAN
By W. J. Fitz Gerald & Co.
Attorney

July 14, 1925.

J. W. CARNAHAN 1,545,736

RESILIENT METAL WHEEL CONSTRUCTION

Filed April 5, 1920   3 Sheets-Sheet 2

Inventor
J. W. CARNAHAN
By W. J. Fitz Gerald & Co.
Attorney

July 14, 1925.

J. W. CARNAHAN

RESILIENT METAL WHEEL CONSTRUCTION

Filed April 5, 1920     3 Sheets-Sheet 3

1,545,736

Inventor

J. W. CARNAHAN

By W. J. Fitz Gerald

Attorney

Patented July 14, 1925.

1,545,736

UNITED STATES PATENT OFFICE.

JOHN WORTH CARNAHAN, OF WASHINGTON, DISTRICT OF COLUMBIA, ASSIGNOR TO CARNAHAN INDUSTRIAL ENGINEERING CORPORATION, OF BRIDGEPORT, CONNECTICUT, A CORPORATION OF DELAWARE.

RESILIENT METAL WHEEL CONSTRUCTION.

Application filed April 5, 1920. Serial No. 371,335.

*To all whom it may concern:*

Be it known that I, JOHN WORTH CARNAHAN, a citizen of the United States, residing at Washington, District of Columbia, have invented certain new and useful Improvements in Resilient Metal Wheel Constructions; and I do hereby declare the following to be a full, clear, and exact description of the invention, such as will enable others skilled in the art to which it appertains to make and use the same.

This invention relates to resilient wheels for automobiles and other vehicles, and the primary object of the invention is the provision of a metal wheel that is considerably stronger than the ordinary wooden wheel, which is practically non-collapsible, and which by its resiliency will cushion and obviate the shocks and jars, whereby to make the vehicle ride easier, as well as increasing the life of the tire, and efficiency of the machine.

Another object is the provision of resilient spokes between the hub and felly of such form and arrangement as to normally hold the hub and felly concentric against ordinary light strains and shocks, and against the ordinary tendency for the weight of the machine to depress the hub, the parts of the wheel being tense between the hub and felly to resist unnecessary displacement and resiliency, yet enabling the hub and felly to yield in all directions in the plane of the wheel when subjected to a sudden jar, shock or stress, such as when the wheel strikes an obstruction or rut in the road, or when the vehicle is being started or stopped resulting in a torsional strain between the hub and felly.

A further object is the provision of such a wheel in which the spokes are sufficiently rigid and tense as to retain the hub and felly concentric under ordinary conditions, and resulting in the stress thereon being received and distributed to all of the spokes simultaneously and practically uniform throughout, thereby avoiding injurious stresses on individual spokes, such as would be apt to unduly burden them, and the arrangement providing for the effectual rebound of the spokes to normal position as soon as the stress or strain is removed.

Another object is to provide novel means for anchoring the spokes to the hub and felly, to provide a strong and rigid construction, without danger of the spokes being crystallized, loosened or torn from either the hub or felly, and retaining the spokes in position under tension at all times to brace the hub and felly in concentric relation against the ordinary stresses, yet permitting of flexibility to a limited degree when abnormal stresses or strains are present.

A further object is the construction of the felly from metal, enabling same to be constructed of pressed sheet metal or other suitable stock, in a convenient and inexpensive manner, and the parts readily assembled and the outer ends of the spokes anchored thereto, to provide a thoroughly rigid felly, which will maintain its circular shape against the severest strains to which the wheel is subjected, and which felly will also be light in weight as compared to a solid or cast felly.

It is also an object of the invention to provide such a wheel which can be used in connection with and applied to the parts of the ordinary wheel now used, that is, the hub member of the present construction being readily applied to an ordinary wheel hub to take the place of the wooden spokes, and an ordinary rim being used for holding the usual pneumatic tire.

The invention also has as a principal object the provision of a metal wheel, the parts of which can be readily pressed or otherwise formed from sheet metal or other metal stock, in small pieces in duplicate, and which can be readily assembled to build up the wheel and providing a thoroughly rigid felly of sectional construction, a strong hub, tense resilient spokes, and secure anchors for the spokes in the hub and felly.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Fig. 3 is an enlarged section through the hub on the line 3—3 of Fig. 1, portions being shown in elevation.

Fig. 6ª is a view similar to Fig. 6 of the felly only, partly in section, with the rim, spokes and other parts removed.

Figure 1:
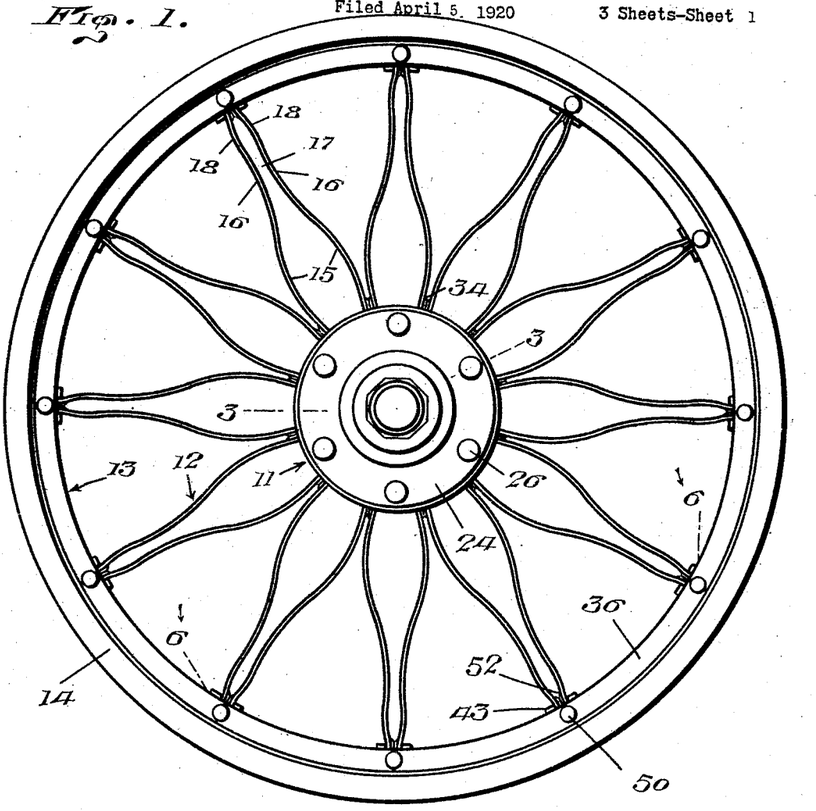
Figure 1 is a side elevation of the improved wheel, with the tire removed.

The wheel comprises a hub 11, from which the spokes 12 radiate to the felly 13 on which the rim 14 is disposed. As shown, an ordinary rim is employed, for holding a pneumatic tire.

Figure 2:
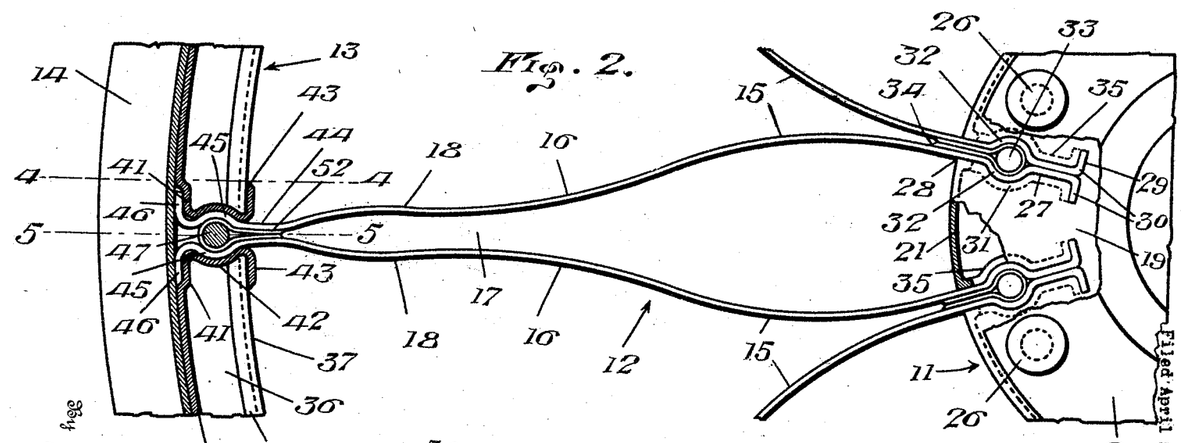
Fig. 2 is a fragmentary elevation illustrating a pair of spokes and the manner of anchoring them in the hub and felly, portions being shown in section.

Each spoke 12 consists of a flat strip or piece, preferably of uniform width and thickness throughout its length, and composed of metal of good quality, so as to possess requisite inherent rigidity and resiliency and to ordinarily maintain its shape, yet permit of flexibility under an excessive strain or load. Each spoke is formed to present a double or duplex compound curve and is of sinuous form, with the curves of gentle curvature and decreasing in size from the inner to the outer end of the spoke. The spoke is not bent much from a straight line between its outer and inner ends, to avoid excessive bending of the spoke when subjected to a compression or tensile strain between its ends, making the spoke practically rigid under ordinary stresses and strains, yet permitting it to give longitudinally in both directions, so that the spoke is both compressible and elastic longitudinally to a limited degree. Thus, each spoke has a main compound curve comprising the curved portion 15 extending from the inner end portion of the spoke, from which the reversely curved portion 16 extends. This compound curve is of a length of about two-thirds of the distance between the hub and felly, extending to the point 17, and from the point 17 to the felly the spoke has a secondary compound curve about the same shape as the main compound curve, yet of smaller size. Thus, the portion 16 merges into the secondary compound curve having the curved portion 18 corresponding to the curved portion 15 but of smaller size. The curved portions 15, 16 and 18 decrease in length or size in succession, from the hub to the felly, whereby the greatest flexure of the spokes is in the curved portions 15 and 16, while the curved portions 18 form secondary flexible points where the spokes can bend or flex near the felly.

The spokes are arranged in pairs, and the spokes of each pair converge toward one another from the hub to the felly, and in view of the double compound curvature of the spokes, the space between them is of a shape quite similar to the outline of a bowling pin with its base adjacent to the hub, and the head adjacent to the felly. Thus, the portions 15 are bowed away from one another, and the portions 16 are bowed toward one another, providing a reduced portion or neck at the point 17, and the portions 18 are bowed apart outwardly beyond the point 17. The shape of the spokes between the point 17 and felly is of about the same shape as the portions of the spokes between the hub and point 17, but of smaller size, thereby providing a spring action of the portions 18 somewhat similar to the portions 15 but of less magnitude. Thus, when there is a compression strain on a pair of spokes between the hub and felly, the opposite ends of the spokes being forced toward one another, will bend the portions 15 away from one another, the portions 16 toward one another, and the portions 18 apart, the greatest bending of the spokes being in the portions 15 and 16. The secondary portions 18, however, serve to absorb and neutralize the strain or stress between the main portions of the spokes and the felly, thereby reducing to a minimum the tendency for the spokes to crystallize at the points where they engage the felly 13. The secondary compound curved portions are therefore important in addition to the main compound curved portions, inasmuch as the main portions provide for the major resiliency of the spokes, while the secondary portions serve to transmit the strains between the main portions and felly in such a manner, as to further cushion or absorb the shocks and to also enable the spokes to bend between the main portions and felly, to eliminate crystallization and breaking of the spokes adjacent to the felly. This will therefore avoid the sharp bending of the spokes adjacent to the felly. The adjacent spokes of the several pairs are in the form of a wish-bone as seen in Fig. 1, such spokes diverging from the hub to the felly, whereby they will brace the hub and felly, to resist the rotary displacement thereof relatively to one another, due to torsion in driving the felly from the hub or in resisting the rotation of the felly by applying a brake to the hub or driving gear. Thus, the tendency for the hub and felly to rotate relatively, due to the driving force or the braking action applied to the hub, will be resisted by the action of the spokes as braces between the hub and felly, inasmuch as the spokes are not disposed precisely radial, although substantially so. The gentle bends or curves of the spokes will enable them to resist longitudinal compression or expansion under ordinary loads and stresses, in order to hold the hub and felly concentric, and the spokes are not bent under ordinary conditions, although they can flex under abnormal stresses and loads. Thus, when the hub and felly are moved relatively to one another, some spokes are compressed longitudinally, while the opposite ones are stretched and the intervening spokes flexed transversely, thereby distributing the strain throughout all of the spokes, without subjecting individual spokes or a group of them to undue strain. The hub and felly will recover their concentric relation as soon as the strain is removed. Furthermore, when there is an abnormal torsional strain between the hub and felly, such as when starting or stopping suddenly, they can rotate relatively slightly, in which event one spoke of each pair is compressed and the other spoke of each pair stretched, applying the stresses to all of the spokes. This action of the spokes is resisted by the bracing action thereof under ordinary strains in starting and stopping, but when the strains are abnormal due to sudden shocks, the spokes can yield as indicated, to avoid the strain and wear and tear on the tire which would result with a rigid wheel. The spokes being disposed with their edges presented laterally, will be thoroughly stiff and rigid transversely, to avoid and resist lateral displacement of the hub and felly, making the wheel thoroughly rigid laterally thereof, and avoiding any possibility of the wheel being broken or distorted by lateral strains, such as when skidding sidewise, hitting a curb, or the like. All of the spokes being rigidly secured to the hub and felly and being under tension, will distribute all of the strains practically uniformly throughout all of the spokes, and a strain applied to one spoke will be distributed to all of them. Due to the curvature of the spokes, the strain applied to either end will be distributed throughout the length of the spoke, the greatest amount of bending occurring in the portions 15 and 16, and the amount of bending decreasing in magnitude from the portions 15 to the outer ends of the spokes. This is of advantage, inasmuch as the amount of bending of the spokes adjacent to the felly is reduced to a minimum, and the bending of the spokes and stresses thereof are gradually reduced from the inner to the outer ends of the spokes.

The hub 11 is of hollow sheet metal construction, and comprises the opposite annular side plates 19 having the annular flanges 20 and 21 at their inner and outer edges extending at an angle therefrom toward one another with their edges abutting, as seen in Fig. 3. These two annular sheet metal parts or sections can be readily pressed from sheet metal and the edges of the parts presented to one another in abutment, thereby providing a closed annular hollow hub member of inexpensive construction, which is light in weight and strong. The hub 11, as shown, is an insert or secondary hub of a size to fit on an ordinary wheel hub 22 having the flanges 23 and 24. Thus, the insert hub 11 can be applied to the ordinary hub to be held between the flanges 23 and 24, from between which the wooden spokes have been removed, or a special hub can be used. However, the provision of the hub 11 enables the same to be applied to an ordinary hub, and the hub 11 can be of various sizes and proportions for application to various wheel hubs. The side plates 19 have apertures 25 for the passage of the bolts 26 which extend through the flanges 23 and 24, thereby clamping the insert hub 11 between said flanges on the main hub 22, and providing for the convenient application of the present structure to and the removal thereof from an ordinary hub, not only for the purpose of installing the present wheel structure on ordinary hubs, but also permitting the wheel to be taken off for repair or for replacement.

The inner terminals of the spokes are anchored within the parts of the hub 11. Thus, the annular side plates 19 have radial slots 27 terminating short of the inner edges of said plates and extending to the outer edges and transversely through the flanges 21, as at 28. The inner terminals of the spokes 12 extend through the slots 28 and within the slots 27. Adjacent terminals of the pairs of spokes are fitted within the slots of the hub, so that the spokes extend in zigzag arrangement between the hub and felly in the annular space therebetween. Thus, the outer ends of the spokes of the several pairs are together, while the inner terminals are separated and assembled with the corresponding terminals of the companion spokes of the adjacent pairs. The inner terminals of the spokes have their edges fitted within the slots 27 of both hub sections, the inner ends of said slots having T-heads 29 and the inner ends of the spokes are bent at an angle away from one another to fit in the heads 29 of said slots, whereby to anchor and position said terminals in the hub. Furthermore, the slots 27 have enlargements 31 between their ends, and the terminals of the spokes have the curved portions 32 separated from one another to fit in the enlargements 31 of the slots, and pins 33 are driven between the portions 32 to hold them locked within the slots, thus further anchoring the spokes in the hub. The terminals of the spokes bear against one another inwardly of the pins 33, and spring keys 34 of thin sheet metal have loops extending around the pins 33 and terminals projecting between the spokes within the slots 28, thereby separating the spokes where they emerge from the hub, to avoid the spokes rubbing against one another at this point. The edges of the metal are swaged inwardly along the slots 27 and 28 and around the bolt holes 25, as at 35, thereby presenting broad bearing surfaces to the spokes and bolts instead of such bearing surfaces being only of a width equal to the thickness of the sheet metal. This will increase the bearing surfaces between the hub and the spokes and bolts, to considerably increase the strength of the connection therebetween.

In assembling the spokes and hub, the spokes can be inserted transversely into the slots of the hub, and the keys 34 and pins 33 then inserted and driven into place, and said pins will slightly expand the keys and separate the portions 32 of the spokes and tightly clamp them seated within the portions 31 of the slots 27, as well as clamping the inner terminals of the spokes against the edges of the slots and abutments 35. The pins 33 are retained in place by friction, and, furthermore, are held between the flanges 23 and 24 of the main hub, and the friction is sufficiently great to hold the parts of the hub 11 assembled, even when such hub is removed from the main hub 22.

Figure 4:
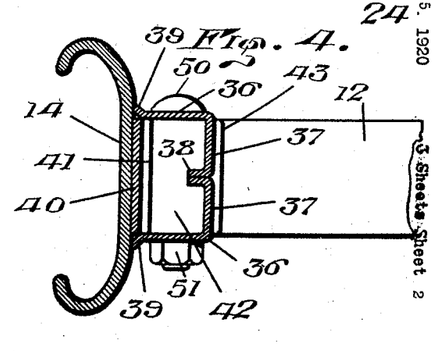
Figs. 4 and 5 are sectional details on the respective lines 4—4 and 5—5 of Fig. 2.
Figure 6:
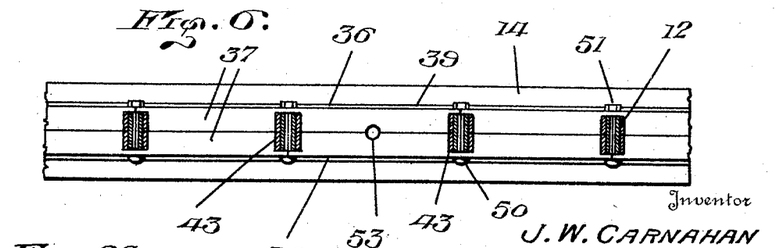
Fig. 6 is a sectional view taken on the line 6—6 of Fig. 1 along the inner circumference of the felly, shown laid flat.
Figure 6A:
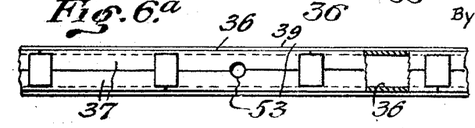

Coming to the construction of the felly 13, it is, like the hub, also constructed of sheet metal and comprises opposite annular rings, each of which is divided into arcuate sections or plates 36. Thus, said plates can be pressed from sheet metal stock without the waste that would be required if the rings of the felly were each of one annular piece. These short arcuate sections 36 are all alike, and the sections of the rings of the felly abut end to end and form the annular side walls of the hollow felly. The sections or plates 36 are disposed parallel to the median plane of the wheel, and at their inner edges are provided with annular series of arcuate flanges 37 extending at an angle, such flanges of the opposite plates 36 extending toward one another and being provided at their adjacent edges with outturned lips 38 which abut one another, as seen in Fig. 4, thereby stiffening and strengthening the flanges 37 and providing a broad bearing surface between them. The plates 36 and lips 38 give the felly considerable radial and longitudinal strength, to resist the distortion of the felly even under considerable stress tending to collapse it into elliptical shape. Furthermore, as shown in Fig. 6, the plates 36 are in staggered relation at the opposite sides with the joints of the plates of one set intermediate the joints of the plates of the other set, so that each joint is stiffened by the corresponding plate of the other set. This avoids the breaking of the felly at the joints, and makes it practically as strong as though the plates 36 were of integral annular construction. This felly is of channel-shaped cross section, as seen in Fig. 4, thereby being strong and light in weight.

Figure 5:
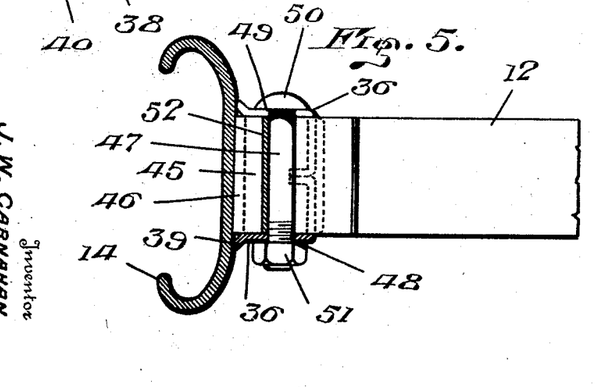

The outer edges 39 of the plates 36 are bent at an obtuse angle away from one another, as seen in Figs. 4 and 5, to have a wedge fit against the edges of metal straps 40 which are welded, riveted or otherwise secured to the inner circumference of the rim 14. These straps 40 are of suitable metal, and are disposed longitudinally of the rim with their ends spaced apart, and one of said straps is located between the outer ends of each two adjacent pairs of spokes. The ends of the straps 40 are bent to provide offsets 41 spaced inwardly from the rim 14, curved seats 42 extending inwardly from the offsets and separated from one another at the adjacent ends of said straps, and lips 43 extending from the inner ends of the seats 42 and overlapping the ends of the flanges 37. The flanges 37 are of a length approximately equal to the distances between the outer ends of the adjacent pairs of spokes and form the inner periphery of the felly, and the ends of the flanges 37 and lips 38 are cut so as to fit snugly against the seats 42 behind the lips 43, as seen in Fig. 2, whereby the terminals of the straps 40 and flanges 37 are fitted together to provide a rigid construction at such points. The plates 36, however, extend across the edges of the terminals of the straps 40, and the spaces between the ends of the flanges 37 provide openings in the inner periphery of the felly, as seen in Fig. 6, for the passage of the terminals of the straps 40 and the outer terminals of the spokes. The spokes of each pair converge together, as at 44, adjacent to the felly, from which point they are curved apart, as at 45, to fit in the seats 42 and the outer ends 46 of the spokes are bent at an angle away from one another to fit snugly between the rim 14 and offsets 41, thereby anchoring the outer terminals of the spokes to the felly. Bolts 47 or pinch rivets are inserted through the plates 36 and between the portions 45 of the spokes, whereby to separate said portions and hold them firmly against the seats 42 and the lips 43 tight against the flanges 37, and spring keys 52 of sheet metal have loops extending around the bolts 47 and terminals extending inwardly between the spokes at the point 44, thereby separating the spokes where they enter the felly and avoiding abrasion of the spokes against one another, and reducing the tendency for the spokes to crystallize where they connect with the felly. The bolts 47 extend at one end through apertures 48 between the ends of the plates 36 and at the other end through notches 49 in the adjacent ends of said plates, and the heads 50 and nuts 51 of said bolts cover said apertures and notches, as well as clamping the plates 36 against the edges of the straps 40 and spokes. The spokes in thus entering the felly with their outer terminals curved apart, passing between the bolts 47 and seats 42, and then bent apart to abut the rim 14 and overlap the offsets 41, provide a rigid anchor between each pair of spokes and the felly, whereby the stresses and strains between the spokes and felly will be properly transmitted from one to the other. The stresses due to the tendency of the portions 45 to move outwardly or inwardly between the seats 42, will be gradually merged between the felly and spokes from one to the other.

It will be noted that the straps 40 at the upper portion of the wheel will serve as key-stone members between the upper ends of the upper spokes, forming a part of the arch comprising the upper portion of the wheel, whereby the upper spokes in being tensioned or under tensile strain will result in said straps or key-stone members taking up the strain by a compressive strain on said members or straps and the upper arch portion of the felly. This will greatly assist in preventing the upper ends of the spokes above the hub from tearing loose from the felly, and will considerably strengthen the felly. Not only does the upper portion of the felly constitute an arch from which the upper spokes are suspended, but the straps or members 40 in the felly provide the keystone effect to take up the strains and to receive compression strains when the upper spokes are under tension.

In assembling the parts, the straps 40 being permanently secured to the rim, the spokes are inserted laterally between the terminals of the straps, and the plates 36 then slid laterally into place, the keys 52 having been inserted between the terminals of the spokes. The bolts 47 are then driven through the felly and between the spokes and then tightened to clamp the parts rigidly together, and to make the felly rigid and substantial. The terminals of the straps 40 hold the plates 36 against the rim, and also serve to effectively transmit the strain between the spokes and the felly. The outer edges of the plates 36 fit the edges of the straps 40 and also abut the inner periphery of the rim 14, and the parts are all locked together by the bolts 47. The terminals of the straps are prevented from spreading by the provision of the flanges 37 located between the terminals of the straps substantially coextensive with the straps where they extend along the rim, and the lips 43 overlapping the flanges 37 will hold the plates 36 against the rim 14, while the bolts 47 clamp the plates 36 against the straps and also clamp the spokes between them.

The flanges 37 of two opposite plates 36 can be provided with adjacent notches forming an opening 53 for the passage of the valve stem of the tire, the rim 14 and corresponding strap 40 being provided with registering openings.

The spokes are all duplicates of one another, being in reversed positions alternately, and the two parts of the hub are also duplicates of one another, as well as the sections or plates 36 of the felly and straps 40. Such parts can be readily manufactured by pressing them from metal, or the like, and the parts can be readily assembled and pressed into position, thereby bringing the spokes under tension to maintain the hub and felly concentric under ordinary loads and strains. The terminals of the spokes are also securely anchored in the hub and felly, to transmit the strains without danger of the spokes loosening or breaking off, and the spokes present a uniformly tense connection between the hub and felly, which will distribute the greatest as well as the small strains uniformly throughout the spokes as a whole.

Figures 7, 8:
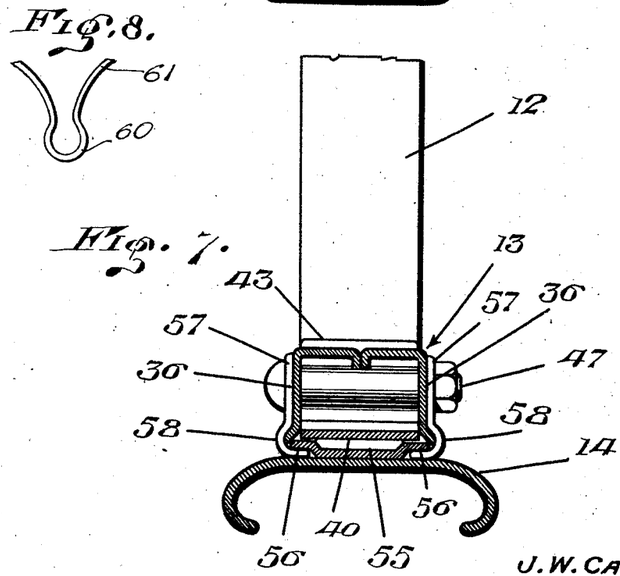
Fig. 7 is a view similar to Fig. 4 showing a modification providing for a demountable rim.
Fig. 8 is an elevation of one of the spoke-anchoring keys showing the form thereof before being compressed and inserted into place.

Fig. 8 illustrates one of the spring keys in its natural open position before being compressed and driven into place. This key is made of thin spring metal, the same as the spokes but preferably thinner, and is highly tempered and hard like the spokes. The key has a loop 60 and diverging terminals 61, said loop being normally opened slightly before being driven home. In applying the key, the terminals 61 are pressed together, thereby contracting the loop 60, so that the key can be inserted between the terminals of the spokes with the loop 60 fitting between and within the separated curved portions of the spokes. When the key is driven into place, the expansion of the loop 60 will spread or separate the spokes to seat the curved portions thereof within the hub or felly, whichever is the case, and the terminals of the key having a tendency to separate will bear tightly against the corresponding spokes, thereby laminating the spokes where they enter the hub or the felly. This will considerably reenforce and stiffen the spokes when they enter the hub or felly, and the spring keys can yield with the spokes thereby serving to modify the tendency for the spokes to bend excessively where they enter the hub or felly. These keys will also lock the spokes within the hub and felly before the insertion of the pins 33 and bolts 47, and when said pins and bolts are driven into the keys, they enlarge the loops thereof to spread the portions 32 and 45 of the spokes and hold them tightly seated under tension, as well as drawing the terminals of the spokes tightly into place. The tightening of the portions 45 against the seats 42 will also draw the lips 43 tightly against the flanges 37. While the spokes and keys are of hard metal, the bolts 47 and pins 33 are of soft metal, as well as the side sections of the hub and straps 40, thereby anchoring the terminals of the spokes in softer metal, and further eliminating the cause for crystallization of the spokes adjacent to the hub and felly, since the spokes in being anchored within soft metal and around keys embracing soft metal, will serve to distribute the strains from the terminals of the spokes without localizing such strains. The soft metal parts of the hub and felly thus take the strains from the spokes in an efficient and effective manner, and, with the keys, eliminate the tendency for the spokes to crystallize where they enter the hub and felly.

The exposed surfaces of the hub and felly are smooth and practically devoid of any exposed recesses or projections in or on which mud, grease or other foreign matter could accumulate, and present a neat and plain appearance, the anchoring means of the spokes being housed within such hub and felly.

By the provision of the construction as above described, the wheel will be thoroughly practical and efficient in use, having the advantages and features as hereinbefore indicated.

Fig. 7, illustrates a modification for use with a demountable rim. In this arrangement, the straps 40 are detached from the rim 14, and members 55 are secured to the rim instead, being provided with offsets or portions 56 fitting the edge portions of the plates 36. Clips 57 are held by the bolts 47, being clamped against the plates 36, and have hooks 58 or other suitable portions to move into engagement with the rim 14 and portions 56 whereby to hold the parts assembled. By loosening the bolts, the clips 57 are loosened and the hooks 58 can be disengaged from the portions 56, thereby enabling the rim to be removed conveniently and subsequently applied to the felly.

Having thus described the invention, what is claimed as new is:—

1. A resilient wheel comprising a hub, felly and resilient spokes connecting them, said spokes being sinuous and having double compound curves and the curved portions decreasing in size from the hub to the felly.

2. A resilient wheel comprising a hub, felly and resilient spokes connecting them, said spokes being formed with a double compound curve including a relatively long compound curved portion adjacent to the hub and a relatively short secondary compound curved portion merging into the aforesaid portion and located adjacent to the felly.

3. A resilient wheel comprising a hub, felly and resilient spokes connecting them, said spokes being arranged in pairs, the spokes of each pair converging from the hub to the felly, the spokes being sinuous and having double compound curves and the curved portions decreasing in size from the hub to the felly.

4. A resilient wheel comprising a hub, felly and resilient spokes connecting them, said spokes being arranged in pairs, the spokes of each pair converging from the hub to the felly, said spokes being of double compound curvature and having relatively long main compound curved portions extending from the hub and secondary relatively short compound curved portions merging into the aforesaid portions and located adjacent to the felly.

5. A resilient wheel comprising a hub, felly and resilient spokes having their terminals rigidly secured to the hub and felly, said spokes being of double-compound curvature and arranged in pairs, the spokes of each pair converging from the hub to the felly, and the space between the spokes of each pair being substantially of the shape of a bowling pin.

6. A wheel comprising a felly composed of annular side walls having flanges extending toward one another and forming the inner periphery of the felly, the adjacent ends of said flanges being spaced apart to provide openings in said inner periphery, spokes having outer terminals extending in pairs through said openings into the felly, and means within the felly for rigidly anchoring said terminals of the spokes in the felly, the last named means including members engaging between said terminals to separate and clamp them within the felly.

7. A wheel comprising a felly composed of annular side walls, seats between said walls, spokes having outer terminals extending in pairs between said walls and between said seats, the terminals of each pair having separated portions bearing against said seats and anchoring the corresponding spokes within the felly, and securing elements connecting said side walls and extending between said separated portions to clamp said portions in opposite directions against said seats.

8. A wheel comprising a felly composed of annular side walls having flanges extending toward one another and forming the inner periphery of the felly, the adjacent ends of said flanges being spaced apart to provide openings in said periphery, seats within the felly adjacent to said openings, spokes having their outer terminals extending in pairs through said openings and between said seats, said terminals of each pair having separated portions to engage said seats and anchor the corresponding spokes in the felly, and securing members connecting said side walls for holding them together and extending between said separated portions to clamp said portions against said seats.

9. A wheel comprising a felly composed of annular side walls, members disposed between said walls and having their adjacent ends located close together, spokes having their outer terminals extending in pairs between said walls and between the adjacent ends of said members, and securing means connecting said side walls between said spoke terminals to hold the walls assembled with said members, and also securing said terminals to the ends of said members.

10. A wheel comprising a felly and spokes, said felly having opposite side plates, the spokes extending between said plates, said plates having flanges at their inner edges extending toward one another and abutting edge to edge between said plates, said flanges extending from one spoke to another with the spokes located between the adjacent ends of said flanges, and securing means connecting said plates outwardly beyond said flanges for securing them together, holding said flanges in abutment, and anchoring the spokes within the felly.

11. A wheel comprising a felly and spokes, said felly having opposite side plates, the spokes extending between said plates, said plates having flanges extending toward one another and the felly having seats between said plates and engaging said flanges, the outer terminals of the spokes fitting said seats to anchor the spokes within the felly.

12. A wheel comprising a felly and spokes, said felly having opposite side plates provided with flanges extending toward one another, the felly having seats between said plates engaging said flanges, the spokes extending in pairs between the side plates and between the ends of said flanges and having portions separated from one another and fitting said seats, and means connecting said plates and holding said portions of the spokes in engagement with said seats.

13. A wheel comprising a felly and spokes, said felly including opposite side plates and a series of straps between said side plates, the spokes extending between said plates, and the outer terminals of the spokes and terminals of the straps having interengaging portions to anchor the spokes within the felly.

14. A wheel comprising a felly and spokes, said felly including opposite side plates and a series of straps, said plates having flanges extending toward one another, the spokes extending between the plates and between the ends of the flanges, the terminals of said straps engaging the ends of said flanges at opposite sides of the spokes, and said terminals of the straps and spokes being bent to interengage one another for anchoring the spokes within the felly.

15. A wheel comprising a felly and spokes, said felly including opposite side plates and a series of longitudinal straps, said plates having flanges extending toward one another, the spokes extending in pairs between said plates and between the ends of the flanges, the terminals of said straps being bent to form seats abutting the ends of the flanges, and lips extending from seats and overlapping said flanges, the outer terminals of the spokes having separated portions fitting in said seats, and securing elements connecting said plates and extending between said portions of the spokes to hold them in said seats.

16. A wheel felly comprising side plates having annular series of arcuate flanges at their inner edges extending toward one another and abutting between said plates, with spaces between the ends of the flanges for the passage of spokes into the felly, and means adjacent to said spaces for rigidly anchoring the spokes between the ends of the flanges.

17. A wheel felly comprising side plates having annular series of arcuate flanges at their inner edges extending toward one another and abutting, with spaces between the ends thereof for the passage of spokes into the felly, and securing elements extending through said plates adjacent to the ends of the flanges for anchoring the spokes within the felly, and securing the plates together.

18. A hollow wheel felly comprising opposite side walls having flanges extending toward one another to form the inner periphery of the felly, each wall and its flange being composed of arcuate sections disposed end to end, said inner periphery having openings for the reception of spokes, the sections of one wall being in staggered relation with the sections of the other wall, and means for securing said walls together and anchoring the spokes within the felly.

19. A wheel felly comprising opposite annular side walls each composed of arcuate sections disposed end to end, the sections of one wall being in staggered relation with the sections of the other wall, and securing elements extending through said walls and having portions bearing against the outer surfaces of said walls, each securing element extending between the adjacent ends of two sections of one wall and through a section of the other wall between the ends of such section.

20. A wheel felly composed of two rings forming the sides and inner periphery of the felly, each ring being divided into arcuate sections disposed end to end, the sections of one ring being in staggered relation with the sections of the other ring, and means within the felly for anchoring spokes therein at the ends of said sections.

21. A wheel felly comprising opposite rings each composed of annular series of arcuate plates arranged end to end, the plates of one ring being in staggered relation with the plates of the other ring, said plates having series of flanges extending toward one another, and means for the attachment of spokes between the ends of said flanges.

22. A wheel felly comprising opposite rings each composed of an annular series of arcuate plates arranged end to end, said plates of one ring being in staggered relation with the plates of the other ring, said plates having flanges at their inner edges extending toward one another, the flanges being arranged in series with their ends adjacent to the ends of said plates of both of said rings, and securing means connecting said plates for the attachment of spokes between the ends of said flanges.

23. A wheel comprising a felly and spokes, said felly including opposite rings composed of annular series of arcuate plates arranged end to end, the plates of one ring being in staggered relation with the plates of the other ring and having annular series of arcuate flanges extending toward one another, spokes extending between the ends of the flanges and between said plates, and means connecting said plates and anchoring the spokes within the felly.

24. A wheel comprising a felly and spokes, said felly including opposite rings each composed of an annular series of arcuate plates arranged end to end, the plates of one ring being in staggered relation with the plates of the other ring, and having annular series of flanges extending toward one another at their inner edges, the spokes extending between the ends of said flanges and between said plates of the two rings, the felly having seats bearing against the ends of said flanges, the spokes being fitted in said seats, and securing elements connecting said plates of the two rings and locking the spokes in said seats.

25. A wheel comprising a felly and spokes, said felly including rings each composed of an annular series of arcuate plates disposed end to end, said plates of one ring being in staggered relation with the plates of the other ring and having flanges at their inner edges extending toward one another, said flanges being arcuate and in annular series with their ends spaced apart adjacent to the ends of said plates, the felly also including a series of straps having their terminals formed with seats abutting the ends of said flanges and provided with lips overlapping said flanges, said spokes extending in pairs between said seats, and having portions fitting in said seats, and securing elements extending through said plates and between the spokes for securing the plates together and locking the spokes in place.

26. A wheel felly comprising annular side members having arcuate series of flanges at their inner edges extending toward one another with their ends spaced apart to receive the spokes, and straps fitted between the outer edges of said members and having their terminals formed to receive and anchor the spokes between them, said terminals engaging the ends of said flanges.

27. A wheel comprising a hollow metal felly having openings in its inner periphery, spokes extending through said openings, and members in the felly with their ends adjacent to said openings, each member extending the distance between two openings, the spokes being clamped and anchored between the adjacent ends of said members.

28. A wheel comprising a hollow metal felly having openings in its inner periphery, spokes extending through said openings, members in said felly having seats adjacent to said openings and portions in said openings bearing against the inner periphery of said felly, the spokes having separated portions clamped and anchored between said seats.

29. A wheel comprising a hollow metal felly having openings in its inner periphery, spokes extending through said openings, and members in the felly with their ends adjacent to said openings, each member extending the distance between two openings, said members having portions at their ends disposed in said openings, the spokes being disposed between said portions and being clamped and anchored between the adjacent ends of said members.

30. A wheel comprising a hollow metal felly having openings in its inner periphery, spokes extending through said openings, and metal straps between the sides of the felly having their ends terminating adjacent to said openings, each strap extending the distance between two openings, the straps being spaced from the inner periphery of the felly and having their end portions formed with seats, said end portions of the straps being disposed in said openings and bearing against the inner periphery of the felly, the spokes being disposed between said end portions of the straps and being clamped and anchored between said seats.

31. A wheel comprising a felly having annular side walls and an inner periphery provided with openings, spokes extending through said openings between said walls, and arcuate members between said walls with their ends adjacent to said openings, the spokes extending between the adjacent ends of said members, said members and spokes being interengaged and secured together to anchor the spokes in the felly, and said members being disposed at the outer edges of said walls to engage a rim surrounding the felly.

32. A wheel comprising a felly having annular side walls, spokes extending between said walls, arcuate straps between said walls at the outer edges thereof for engagement with a rim surrounding the felly, the terminals of said straps extending inwardly toward the center of the wheel, the spokes extending between the adjacent terminals of said straps, said spokes and strap terminals being bent to interengage and anchor the spokes to the felly, and means securing said side walls, straps and spokes together.

In testimony whereof I have signed my name to this specification in the presence of two subscribing witnesses.

JOHN WORTH CARNAHAN.

Witnesses:
MONROE E. MILLER,
THOS. W. RILEY.